Patented Oct. 21, 1952

2,614,962

UNITED STATES PATENT OFFICE 2,614,962

PHARMACEUTICAL COMPOSITION FOR USE IN THE TREATMENT OF KERATIN

William O. Elson, Chicago, Ill., assignor to The Kendall Company, Boston, Mass., a corporation of Massachusetts Application July 16, 1949, Serial No. 105,084

11 Claims. (Cl. 167—61)

This invention is concerned with the treatment of keratin of the human skin and specifically relates to new and improved compositions useful in the treatment and removal of calluses, corns and other undesirable keratin and keratinaceous matter.

Compositions of this invention contain an active agent of a suitable type which, when the composition is applied to a keratin surface on living tissue, acts in a highly improved manner to cause sloughing off of the keratin. Such agents do not appreciably destroy keratin and are hence properly termed keratin exfoliating agents.

Preparations causing exfoliation, e. g. of the nature of those commonly used as the medicament associated with corn pads, are presently composed of a keratin exfoliating agent, usually salicylic acid, combined with plasticized rubber or petrolatum and with or without fillers. Preparations of a conformable, more or less adhesive nature result, which, when applied, provide prolonged intimate contact between the exfoliating agent used and the keratin. Such contact is necessary to insure efficacious removal of the keratin. Preparations of this type have been widely used and universally accepted for fifty years in the treatment of calluses, corns and other conditions in which keratin exfoliation is indicated.

The compositions of this invention are keratin exfoliatives which comprise a keratin exfoliating agent such as salicylic acid mixed with a silicone with or without an inert filler material. As will be more fully described hereinafter, such silicone preparations have been found clinically and otherwise to have keratin exfoliative action which is quicker, more effective and considerably less painful than previous compositions. Additionally, preparations containing silicone have other chemical and physical characteristics which are much more acceptable and satisfactory from the standpoint of the user.

Figure 1:
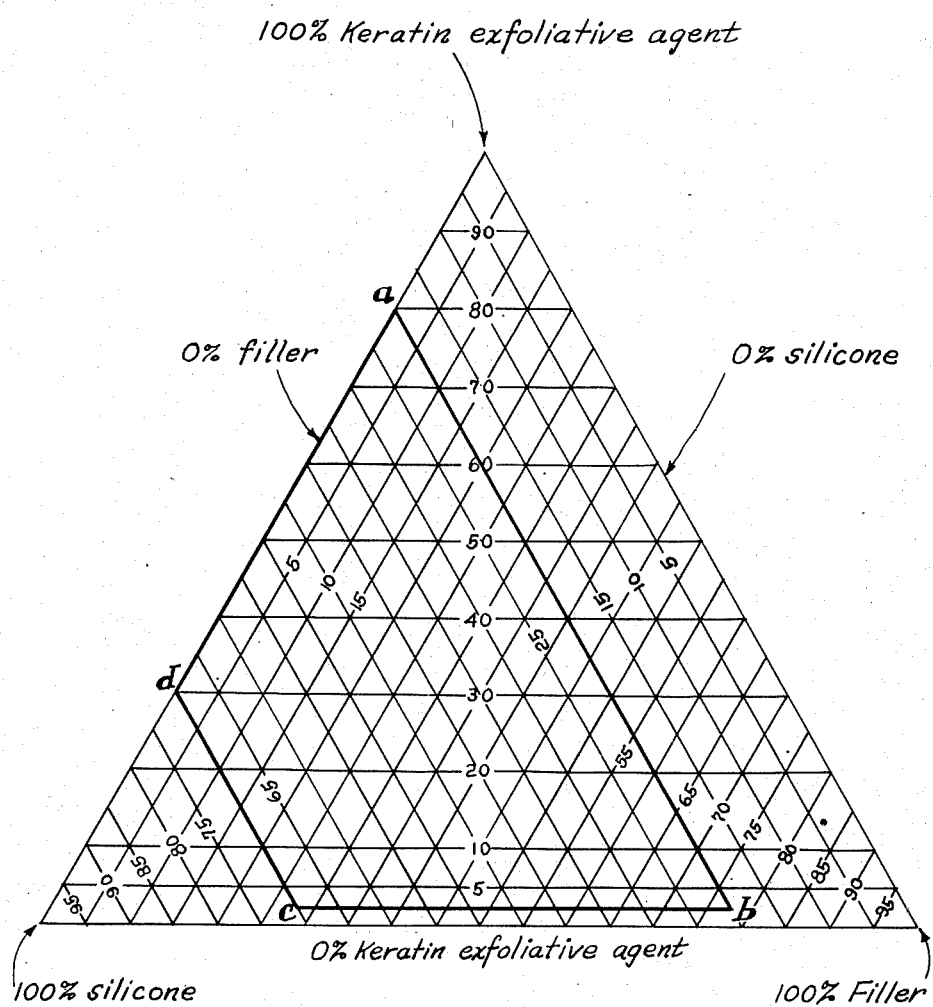
Figure 1 is a ternary diagram indicating the preferred preparations of this invention.

The action of keratin exfoliative preparations when applied, for example, to a hypokeratotic lesion, is based upon the release of the exfoliating agent from the preparation by solution in moisture from the body surface, so that the agent comes into intimate contact with the keratinaceous material to be removed. One of the most remarkable features of this invention is the incongruity of using an extremely hydrophobic material in intimate mixture with an agent which depends for its action upon solubility in body moisture. Paraffin is commonly accepted as being one of the most water repellent materials, yet the silicones are at least as repellent as paraffin.

But despite indications and contrary to all expectations that silicones would be poor ingredients for preparations where extraction by moisture of the agent from the preparation is involved, the converse is actually the case as is hereinafter demonstrated.

Extraction by body moisture appears definitely correlated on the basis of clinical observation to extraction by water of keratin exfoliating agents from preparations containing them. Using that correlation, the clinical superiority of silicones as ingredients of keratin exfoliative compositions has been effectively demonstrated. Comparative determinations of the extraction by water of an exfoliating agent, such as salicylic acid, from compositions containing respectively, plasticized rubber, petrolatum and silicones show rates of withdrawal of the agent by water from the latter in entirely different ranges from rates of withdrawal from rubber and petrolatum preparations previously known. These determinations go a long way to explain the improved exfoliative action of compositions of this invention.

In addition to improved keratin exfoliative activity, silicone containing compositions of this invention have inherent physical and chemical characteristics which render them otherwise highly desirable. Such silicone compositions, because silicones are non-toxic, permit the desired exfoliation without causing undesirable additional toxic reactions due to the liquid or plastic ingredients.

Exfoliative preparations made with silicones remain soft and substantially unaffected after long periods of storage under adverse conditions as a result of the non-volatile and chemically stable characteristics of the ingredients. In this respect, such silicone exfoliative preparations are definitely superior to other previously used compositions, particularly to plasticized rubber compositions which, even under the best conditions of ordinary storage, deteriorate due to oxidation and chemical action.

Silicone exfoliative compositions of this invention have effective exfoliative activity in very viscous, doughy consistencies. Furthermore, silicone exfoliative preparations are exceedingly heat stable with respect to viscosity, so that original preparation consistencies are maintained over a wide temperature range. By the provision of effective doughy silicone preparations which do not soften appreciably in use, two of the great disadvantages of prior art compositions utilized in corn treatment are overcome. At body temperature prior art compositions have a tendency to become mushy and gummy, so much so that frequently solvent cleaning is required to remove residue from skin and clothing. Silicone preparations, on the other hand, may be selected with adhesive properties as desired and such properties will remain constant.

But a far more important advantage of silicone preparations for corn treatment is the greatly reduced involvement of healthy tissue. After application, the doughy compositions of this invention preferred for corn treatment maintain their original areas of contact without undesirable flow into the surrounding areas of healthy tissue. In striking contrast, prior art compositions, which are initially less viscous, become even more fluid when exposed to body temperature. The resultant substantial flow of the compositions involves contact of the exfoliating agent with healthy tissue. Clinical observations demonstrate that the use of prior art compositions causes substantial involvement of healthy tissue in more than 45% of the total cases whereas only 4% of the total cases treated with the preparations of this invention show such substantial involvement. Close correlation between clinical observations of healthy tissue involvement and patient complaints of distress would indicate that such involvement may be an important cause of burning, itching and the general distress of corn treatment.

As specific examples of suitable keratin exfoliative medicament formulae in accordance with this invention, the following are representative, all proportions by weight:

Example 1

Silicone (methyl silicone, 30,000 centistokes) _____per cent__ 30
Keratin exfoliating agent (powdered salicylic acid) _____per cent__ 40
Filler (starch) _____do____ 30
Plasticity at 40° C. as measured on Williams plastometer _____ 86

Example 2

Silicone (methyl silicone 112 centistokes) _____per cent__ 29
Keratin exfoliating agent (powdered salicylic acid) _____per cent__ 39.5
Filler (starch) _____do____ 31.5
Plasticity at 40° C. as measured on Williams plastometer _____ 125

Example 3

Silicone (methyl phenyl silicone 1,000 centistokes) _____per cent__ 29
Keratin exfoliating agent (powdered salicylic acid) _____per cent__ 39
Filler (starch) _____do____ 32
Plasticity at 40° C. as measured on Williams plastometer _____ 93

Example 4

Silicone (methyl silicone 250,000 centistokes) _____per cent__ 35
Keratin exfoliating agent (powdered salicylic acid) _____per cent__ 41.5
Filler (starch) _____do____ 23.5
Plasticity at 40° C. as measured on Williams plastometer _____ 36

Example 5

Silicone (amyl silicone 100,000 centistokes) _____per cent__ 24.5
Keratin exfoliating agent (powdered salicylic acid) _____per cent__ 41.5
Filler (starch) _____do____ 34
Plasticity at 40° C. as measured on Williams plastometer _____ 146

Example 6

Silicone (methyl silicone 30,000 centistokes) _____per cent__ 33⅓
Keratin exfoliating agent (powdered salicylic acid) _____per cent__ 33⅓
Filler (sodium carboxymethyl cellulose) _____per cent__ 33⅓
Plasticity at 40° C. as measured on Williams plastometer _____ 50

Example 7

Silicone (methyl silicone 1,000 centistokes) _____per cent__ 25
Keratin exfoliating agent (powdered salicylic acid) _____per cent__ 40
Filler (kaolin) _____do____ 35
Plasticity at 40° C. as measured on Williams plastometer _____ 129

Example 8

Silicone (methyl silicone 1,000 centistokes) _____per cent__ 70
Keratin exfoliating agent (powdered salicylic acid) _____per cent__ 30
Viscosity by rising bubble__centipoises__ 8925.23

Example 9

Silicone (butyl silicone 1,000 centistokes) _____per cent__ 70
Keratin exfoliating agent (powdered salicylic acid) _____per cent__ 2
Filler (starch) _____do____ 28
Viscosity by rising bubble__centipoises__ 3477.96

Examples 8 and 9 above have a salve-like consistency and although more fluid than the consistencies preferred for corn treatment are nevertheless in the useful range of preparations and may even be preferred for treatment of keratin where an ointment is indicated.

Example 10

Silicone (benzyl silicone 30,000 centistokes) _____per cent__ 20
Keratin exfoliating agent (powdered salicylic acid) _____per cent__ 2
Filler (starch) _____do____ 78
Plasticity at 40° C. as measured on Williams plastometer _____ 155

Example 11

Silicone (propyl silicone 60,000 centistokes) _____per cent__ 20
Keratin exfoliating agent (powdered salicylic acid) _____per cent__ 80
Plasticity at 40° C. as measured by Williams plastometer _____ 116

Preparation 10 and 11 have a tendency to be somewhat crumbly and slightly drier than those preferred for corn treatment but are nevertheless in the effective range and may be preferred for some purposes.

The Williams plastometer by which the indicated plasticity indices of Examples 1–7, 10 and 11 were obtained consists of two horizontal parallel plates between which the sample is pressed by a downward movement imparted to the top plate by a 5 kilogram weight. The samples were conditioned at 40° C. at which temperature the tests were conducted. Suitable samples were prepared for the tests by cutting 14 mm. cylinders with a cork borer and trimming the thickness to give sample weights of 1.84 grams, each. The samples were placed between sheets of cellophane and subjected to plastometer pressing for three minutes, each, at which time distance in thousandths of an inch between plates as indicated on the plastometer gauge was noted. The plasticity indices were obtained by subtracting the two thicknesses of cellophane in each instance to give actual thickness of each sample.

The viscosity indices indicated in Examples 8 and 9 were obtained by comparing the average times necessary for a bubble to rise at 70° F., a given distance in a constant diameter tube of the sample and of a known viscosity oil, there being a direct relation between such times and the respective viscosities. Oil used in the test was standard viscosity oil having a viscosity of 1612.3 centipoises at 70° F.

The scope of the materials which I have discovered to be extremely useful as ingredients in keratin exfoliative preparations are liquid (up to 1,000,000 centistokes viscosity) and semi-solid silicones which may be described as polymers represented by multiples of the structure:

where R is a hydrocarbon radical.

I have used silicones in viscosities ranging from as low as 112 centistokes up to the maximum viscosity non-solid silicone commercially available, with results ranging from good to excellent. I prefer viscosities in excess of 1000 centistokes, however, because of the increased cohesion which preparations utilizing such viscosities possess. The plastic silicones of very high viscosity are practical, so long as they retain sufficient gumminess to be adhesive and sufficient plasticity to be workable in the fingers. While all of the silicones answering to the above general description are suitable, those which I prefer, are the lower alkyl silicones particularly methyl silicone, the aryl silicones preferably benzyl silicone and the alkyl-aryl silicones particularly methyl phenyl silicone.

In the representative examples given above the keratin exfoliating agent used was salicylic acid because of its outstanding exfoliative activity. Any other exfoliating agent including sulfosalicyclic acid, p-hydroxybenzoic acid, m-hydroxybenzoic acid, and resorcinol (all much inferior in exfoliative properties) may be substituted in the same or equivalent proportions in the formulae for salicylic acid, it being understood that the invention is not confined to any particular type of keratin exfoliating agent.

Figure 2:
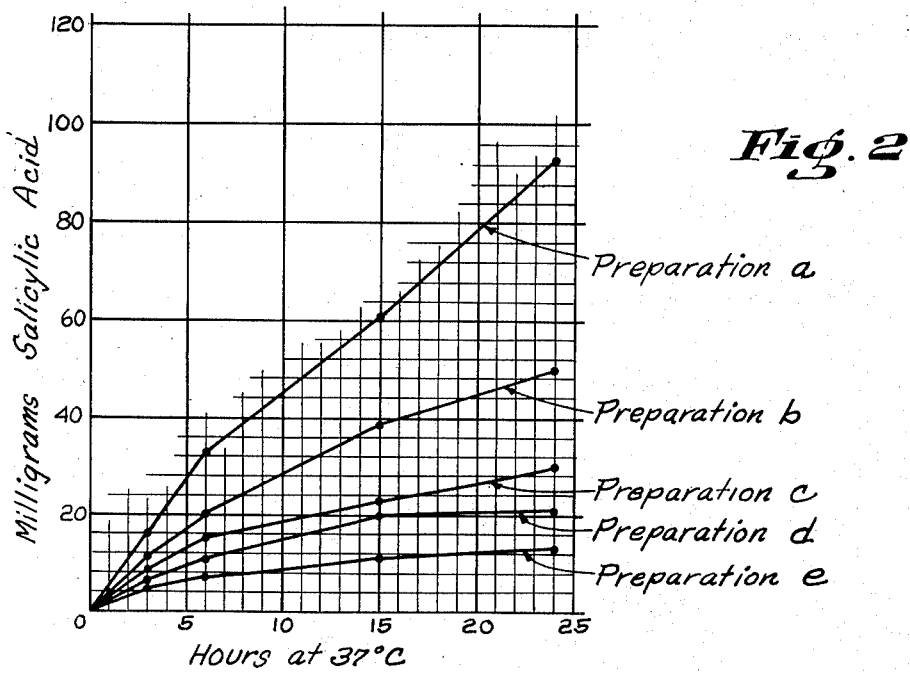
Figure 2 is a graphic representation of the relative rates of extraction by water of salicylic acid from compositions containing silicone, plasticized rubber and petrolatum with added filler.
Figure 3:
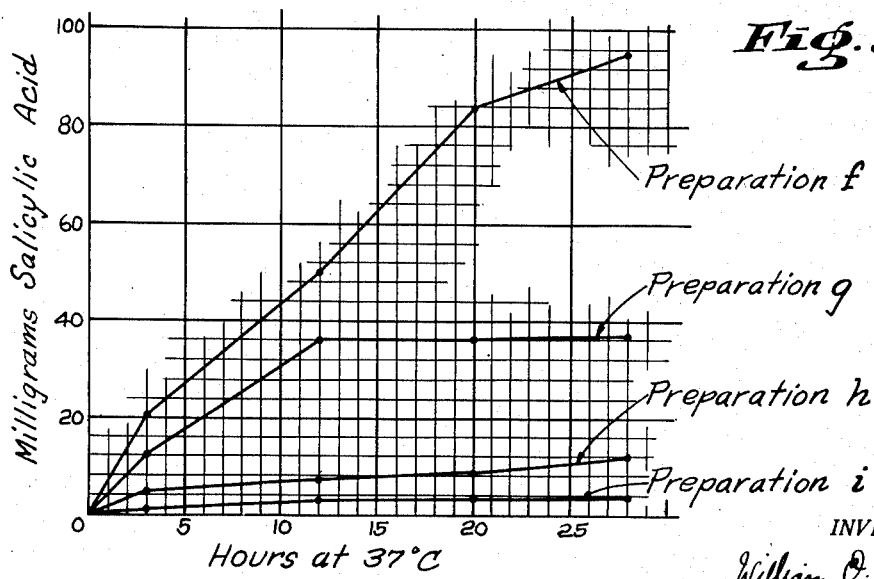
Figure 3 is a graphic representation of the relative rates of extraction by water of salicylic acid from unfilled compositions containing silicone and petrolatum respectively.

Figures 2 and 3 show the comparative rates of extraction of salicyclic acid by water from silicone, petrolatum and plasticized rubber containing compositions in accordance with the quantitative method described by H. A. Clymer and R. J. Ferlanto (J. Am. Pharm. 36, 211, 1947).

Because of the fact that test preparation $c$ has so much filler as to be impractical as a commercially usable preparation, test preparation $d$, which is a commercial preparation, is included in Figure 2 for comparison.

Filled preparations tested were as follows, parts by weight:

*Test preparation a (total net weight 3.45 grams)*

| | Per cent |
|---|---|
| Keratin exfoliating agent (powdered salicylic acid) | 40 |
| Silicone (methyl silicone 30,000 centistokes) | 30 |
| Filler (starch) | 30 |

*Test preparation b (total net weight 3.75 grams)*

| | Per cent |
|---|---|
| Keratin exfoliating agent (powdered salicylic acid) | 40 |
| Silicone (methyl silicone 30,000 centistokes) | 30 |
| Filler (sulfur) | 30 |

*Test preparation c (total net weight 2.95 grams)*

| | Per cent |
|---|---|
| Keratin exfoliating agent (powdered salicylic acid) | 40 |
| Plasticized rubber | 30 |
| Filler (starch) | 30 |

*Test preparation d (total net weight 3.16 grams)*

| | Per cent |
|---|---|
| Keratin exfoliating agent (powdered salicylic acid) | 40 |
| Plasticized rubber | 56 |
| Filler (starch) | 4 |

*Test preparation e (total net weight 3.36 grams)*

| | Per cent |
|---|---|
| Keratin exfoliating agent (powdered salicylic acid) | 40 |
| Petrolatum | 30 |
| Filler (starch) | 30 |

The test preparations were tightly packed and acurately leveled in identical aluminum cylindrical cups, 20 mm. inside diameter and 8 mm. deep. Five cups each of preparations $a$, $b$, $c$, $d$ and $e$ were thus prepared, placed in individual 8 ounce glass-stoppered bottles, covered with 50 cc. of distilled water, and maintained at body temperature (98.6° F.). At various time intervals, as indicated in Figure 2, five bottles containing respectively preparations $a$, $b$, $c$, $d$, and $e$ were opened, the preparation cups removed, and the extraction solution titrated with a $\frac{1}{10}$ normal solution of sodium hydroxide, using phenolphthalein as an indicator. The salicylic acid levels of the extraction solutions from preparations $a$, $b$, $c$, $d$, and $e$ were obtained in milligrams and plotted as indicated in Figure 2. From the curves indicated, it is evident that preparation $a$ containing silicone, starch and salicylic acid is many times more efficient in the rapidity of extraction of the keratin exfoliating agent than is any of the non-silicone preparations. These graphs also indicate that the best results may be expected from preparations using a filler such as starch which swells on contact with water. However, even when the filler used with silicone is completely unaffected by water such as the sulfur of preparation $b$, the rate of extraction is considerably better than preparations containing similar percentages of exfoliating agent but using petrolatum or plasticized rubber with starch.

As a further test of the efficiency of extraction by water of the agent from silicone exfoliative preparations, the following preparations without filler were prepared, parts by weight:

Test preparation f (total net weight 3.37 grams)

| | Per cent |
|---|---|
| Keratin exfoliating agent (powdered salicylic acid) | 70 |
| Silicone (methyl silicone 30,000 centistokes) | 30 |

Test preparation g (total net weight 2.80 grams)

| | Per cent |
|---|---|
| Keratin exfoliating agent (powdered salicylic acid) | 30 |
| Silicone (methyl silicone 30,000 centistokes) | 70 |

Test preparation h (total net weight 3.25 grams)

| | Per cent |
|---|---|
| Keratin exfoliating agent (powdered salicylic acid) | 70 |
| Petrolatum | 30 |

Test preparation i (total net weight 2.56 grams)

| | Per cent |
|---|---|
| Keratin exfoliating agent (powdered salicylic acid) | 30 |
| Petrolatum | 70 |

In this series the preparations containing the same percentages of acid appeared superficially almost identical in physical properties at room temperature, but when they were given the extraction test above outlined the results as plotted in Figure 3 show the rates of extraction of acid from the silicone preparations f and g to be many times faster than were such rates from the other preparations.

In a similar extraction test using cups filled with a mixture of silicone and starch, a zero acid level was obtained, demonstrating that when mixtures of these materials with an exfoliating agent are tested, the acid level indicated is due solely to the agent which has been extracted from the material in the cup.

As is shown in the ternary diagram, Figure 1, by the area within the polygon "abcd" and by the examples, the preferred preparations of this invention vary from 2% to 80% keratin exfoliating agent, from no filler to 78% filler, and from 20% to 70% silicone. The consistency of a preparation for any given purpose may be chosen as the occasion seems to demand. For foot products I prefer a consistency about that of pie-dough or slightly stiffer than such dough (plasticity at 40° C. of 36–155 by Williams plastometer). In such consistency the preparations may be rolled out into sheets whereupon small pellets of the desired size may be cut with a cutter die. I prefer, however, to extrude the preparation, cutting off pellets of the desired thickness. The pellets may be separately mounted by pressing them onto a suitable backing or they may be combined with cushioning material and/or adhesive tapes.

As the filler in preparations of this invention, I prefer starch, as has been previously indicated. Inert materials generally are suitable, however, the following list of satisfactory fillers being representative rather than limitative. Suitable fillers which like starch swell in the presence of moisture are kaolin, wood flour, talc, zein and clays such as bentonite. This group of fillers is preferred. Other suitable fillers are water soluble such as gum arabic and sodium carboxymethyl cellulose. Still others are relatively insoluble such as magnesium silicate, aluminum silicate, calcium silicate, sulfur, diatomaceous earth, and asbestos.

If it is desirable, a local anesthetic may be added to any of the above examples or other similar preparations without changing their keratin exfoliative or general physical properties appreciably. For instance, the material known popularly as dibucaine or percaine and which has the chemical description, butyloxycinchoninic acid diethyl-ethylene diamine hydrochloride, may be advantageously added to about 1% of the total weight of the other ingredients.

I claim:

1. A keratin exfoliative pharmaceutical product comprising a backing material carrying on a surface thereof a doughy plastic composition comprising a mixture of a silicone having a viscosity between $10^2$ and $10^6$ centistokes and a solid acidic keratin exfoliating agent.

2. A keratin exfoliative comprising a mixture of a silicone and a solid acidic keratin exfoliating agent, said agent being present in an amount of 30% to 80% by weight of the composition.

3. A keratin exfoliative comprising a mixture of a silicone and a keratin exfoliating agent in the form of a solid carboxylic acid.

4. A keratin exfoliative as claimed in claim 3, wherein the silicone has a viscosity between $10^2$ and $10^6$ centistokes.

5. A keratin exfoliative as claimed in claim 3, wherein the silicone is methyl silicone.

6. A keratin exfoliative as claimed in claim 3, wherein the silicone is a dimethylsiloxane polymer.

7. A keratin exfoliative as claimed in claim 3, having as an additional ingredient, a finely divided granular filler, and wherein the proportions are from 2% to 80% of said agent, from 20% to 70% of said silicone, and the remainder consists essentially of filler.

8. A keratin exfoliative comprising a mixture of a silicone and a keratin exfoliating agent in the form of a solid cyclic carboxylic acid.

9. A keratin exfoliative comprising a mixture of a silicone and salicylic acid.

10. A keratin exfoliative comprising a mixture of a silicone having a viscosity between $10^2$ and $10^6$ centistokes, a finely divided granular filler and salicylic acid.

11. A keratin exfoliative as claimed in claim 10, wherein the filler is starch and the silicon is methyl silicone.

WILLIAM O. ELSON.

REFERENCES CITED

The following references are of record in the file of this patent:

UNITED STATES PATENTS

| Number | Name | Date |
|---|---|---|
| 2,389,803 | MacGregor | Nov. 27, 1945 |
| 2,389,804 | McGregor | Nov. 27, 1945 |
| 2,459,387 | McGregor | Jan. 18, 1949 |

OTHER REFERENCES

Eller et al. J. A. M. A. March 8, 1941, pages 934–5.

Dow Corning Silicone Note Book Fluid Series No. 3, Issued September 1948, page 21.

Lesser Drug and Cosmetic Industry, January 1949, page 45.